(12) United States Patent
Kim

(10) Patent No.: US 12,466,567 B2
(45) Date of Patent: Nov. 11, 2025

(54) POWER UNIT

(71) Applicant: KOREA AEROSPACE RESEARCH INSTITUTE, Daejeon (KR)

(72) Inventor: Keun Bae Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 237 days.

(21) Appl. No.: 18/477,729

(22) Filed: Sep. 29, 2023

(65) Prior Publication Data

US 2024/0166359 A1 May 23, 2024

(30) Foreign Application Priority Data

Nov. 18, 2022 (KR) .................. 10-2022-0155810

(51) Int. Cl.

| | |
|---|---|
| B64D 31/18 | (2024.01) |
| B60W 10/02 | (2006.01) |
| B64D 27/02 | (2006.01) |
| B64D 27/33 | (2024.01) |
| F02B 63/04 | (2006.01) |
| F16D 41/12 | (2006.01) |
| H02K 7/108 | (2006.01) |
| H02K 21/22 | (2006.01) |

(52) U.S. Cl.
CPC ............ *B64D 27/33* (2024.01); *F02B 63/042* (2013.01); *F16D 41/12* (2013.01); *H02K 7/108* (2013.01); *H02K 21/22* (2013.01); *B64D 27/026* (2024.01)

(58) Field of Classification Search
CPC ....... F02B 63/042; F16D 41/12; H02K 7/108; H02K 21/22; B64D 27/026; B64D 27/33; B64D 27/35; H02P 2101/30; H02P 15/00; B61D 31/18; F03D 9/25; F02C 7/36; B60L 2240/425; B60W 10/08; B60W 10/02
USPC .................................. 440/1; 477/8; 903/946
See application file for complete search history.

(56) References Cited

U.S. PATENT DOCUMENTS

| | | | | |
|---|---|---|---|---|
| 4,868,437 A * | 9/1989 | Wagner | ................... | F04D 27/00 310/78 |
| 5,557,930 A * | 9/1996 | Cakmaz | ................ | F04D 27/008 123/41.12 |
| 8,336,814 B2 * | 12/2012 | Reinhardt | ............... | B60L 50/15 244/58 |
| 9,586,665 B2 * | 3/2017 | Aschaber | ............... | B63H 21/21 |

(Continued)

FOREIGN PATENT DOCUMENTS

DE 102007033356 A1 * 1/2009 ............ B64D 31/00

*Primary Examiner* — Burton S Mullins
(74) *Attorney, Agent, or Firm* — Perman & Green, LLP

(57) ABSTRACT

A power unit includes an engine including a driving shaft, a power generator provided on the driving shaft and configured to supply electric energy to a flight vehicle, and a thrust generator provided on an outer side of the power generator and configured to provide a propulsion force to the flight vehicle. When a temperature of the power generator is greater than or equal to a first temperature, the power generator and the thrust generator are decoupled from each other, and the power generator is driven by an output of the engine and supplies the electric energy to the flight vehicle. When the temperature of the power generator is less than the first temperature, the power generator and the thrust generator are coupled to each other, and the thrust generator is driven by the output of the engine and provides the propulsion force to the flight vehicle.

11 Claims, 15 Drawing Sheets

(56) References Cited

U.S. PATENT DOCUMENTS

| | | | |
|---|---|---|---|
| 11,053,019 B2* | 7/2021 | Mackin | B64D 27/16 |
| 2008/0184906 A1* | 8/2008 | Kejha | B64D 27/33 |
| | | | 102/374 |
| 2010/0072318 A1* | 3/2010 | Westenberger | B64D 37/04 |
| | | | 244/54 |
| 2011/0154805 A1* | 6/2011 | Heathco | F01D 15/10 |
| | | | 60/793 |
| 2012/0083173 A1* | 4/2012 | McMillan | B63H 21/20 |
| | | | 903/930 |
| 2021/0167665 A1* | 6/2021 | Cabello Eras | H02K 7/12 |
| 2021/0388733 A1* | 12/2021 | Valois | F02C 3/073 |
| 2024/0132226 A1* | 4/2024 | Zatorski | F02C 9/56 |

* cited by examiner (a)

(a)

(c)

POWER UNIT

CROSS-REFERENCE TO RELATED APPLICATION

This application is based on and claims priority under 35 U.S.C. § 119 to Korean Patent Application No. 10-2022-0155810, filed on Nov. 18, 2022, in the Korean Intellectual Property Office, the disclosure of which is incorporated by reference herein in its entirety.

BACKGROUND

1. Field

The disclosure relates to a power unit, and more particularly, to a power unit capable of selectively driving a power generator or a thrust generator via a single engine.

2. Description of the Related Art

Flight vehicles based on a hybrid power system including an engine, a generator, and a battery fly by driving the generator via the engine and then supplying power to a motor that drives a propeller or by directly driving the propeller via the engine. Depending on the shape and assignment conditions of flight vehicles, the engine is used only for one of two purposes: for driving the generator or for directly driving the propeller. That is, an engine for driving the generator and an engine for driving the propeller are separately provided. This causes an increase in the volume and weight of the flight vehicles and limits the loading of equipment for assignments of the flight vehicles.

The above-described background art includes technical information owned by the inventor to derive the disclosure or acquired by the inventor while deriving the disclosure, and thus should not be construed as known technology disclosed to the general public prior to the filing of the present application.

SUMMARY

Provided is a power unit including an engine, a power generator, and a thrust generator which are designed as an integrated single body. The power generator and the thrust generator may be selectively driven by a single engine, and thus, the volume and weight of a flight vehicle may be reduced.

However, the above objects are merely examples, and one or more embodiments are not limited thereto. Objects not mentioned above are clearly understood by those skilled in the art from the specification and the accompanying drawings.

Additional aspects will be set forth in part in the description which follows and, in part, will be apparent from the description, or may be learned by practice of the presented embodiments of the disclosure.

According to an aspect of the disclosure, a power unit includes an engine including a driving shaft, a power generator provided on the driving shaft and configured to supply electric energy to a flight vehicle, and a thrust generator provided on an outer side of the power generator and configured to provide a propulsion force to the flight vehicle, wherein when a temperature of the power generator is greater than or equal to a first temperature, the power generator and the thrust generator are decoupled from each other, and the power generator is driven by an output of the engine and supplies the electric energy to the flight vehicle, and when the temperature of the power generator is less than the first temperature, the power generator and the thrust generator are coupled to each other, and the thrust generator is driven by the output of the engine and provides the propulsion force to the flight vehicle.

In the embodiment, the power generator may include at least one hook enabling decoupling and coupling between the thrust generator and the power generator and at least one insertion groove formed at a position at which the hook is located, and having a shape corresponding to a shape of the hook, wherein the thrust generator includes at least one coupling groove formed at the position corresponding to the hook.

In the embodiment, the power generator may include a rotor that rotates integrally with the driving shaft, the thrust generator may include a housing that is located coaxially with the rotor, the hook may be located on the rotor, the insertion groove may be formed in the rotor at a position at which the hook is located, and the coupling groove may be formed in the housing at a position corresponding to the hook.

In the embodiment, when the temperature of the power generator is greater than or equal to the first temperature, the hook may be inserted into the insertion groove, and the power generator and the thrust generator may be decoupled from each other.

In the embodiment, when the temperature of the power generator is less than the first temperature, the hook may protrude out from the insertion groove and is coupled to the coupling groove, and the power generator and the thrust generator may be coupled to each other.

In the embodiment, the hook may include a first metal and a second metal that have thermal expansion coefficients different from each other.

In the embodiment, the first metal having a greater thermal expansion coefficient than the second metal may be located on the outer side of the power generator.

In the embodiment, when the temperature of the power generator is greater than or equal to the first temperature, the hook may be bent in a direction toward the second metal and be inserted into the insertion groove, and when the temperature of the power generator is less than the first temperature, the hook may be restored to an original shape thereof and coupled to the coupling groove.

In the embodiment, the hook may include a shape memory alloy.

In the embodiment, the hook may have a shape so that the hook is inserted into the insertion groove at a temperature greater than or equal to the first temperature and coupled to the coupling groove at a temperature less than the first temperature.

In the embodiment, when the temperature of the power generator is less than the first temperature, the power generator may receive the electric energy from the flight vehicle and provide additional power to the thrust generator.

Other aspects, features, and advantages in addition to those described above are apparent from the following detailed description, claims, and drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
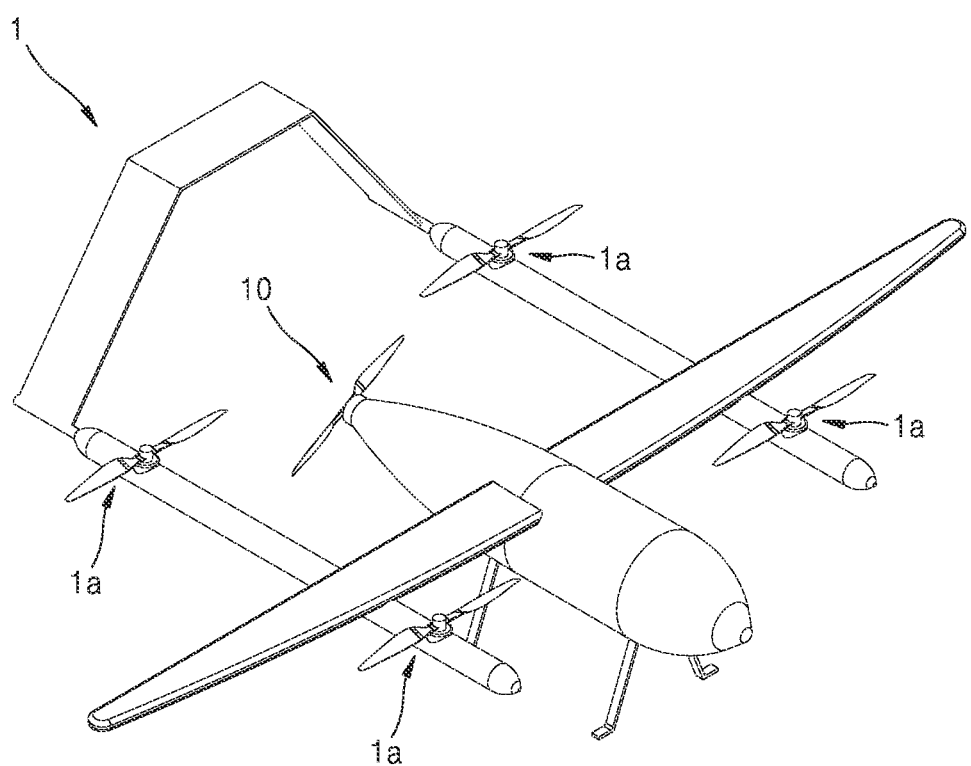
FIG. 1 is a view showing a drone as an example of a flight vehicle including a power unit according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Since the disclosure may be diversely modified and have various embodiments, specific embodiments are exemplified in the drawings and described in detail in the detailed description of the disclosure. However, this is not intended to limit the disclosure to the specific embodiments, and it should be understood that the disclosure covers all the modifications, equivalents, and replacements within the idea and technical scope of the disclosure. In the description of the disclosure, the same components are denoted by the same reference numerals even though illustrated in another embodiment.

Hereinafter, embodiments of the disclosure are described in detail with reference to the accompanying drawings, and when describing with reference to the drawings, the identical or corresponding components are given with the same reference numerals, and repeated descriptions thereof are omitted.

In the following embodiments, terms "first" and "second" are used to distinguish one component from another component, but these components should not be limited by these terms.

In the following embodiments, the singular forms include the plural forms as well, unless the context clearly indicates otherwise.

In the following embodiments, the terms "comprises" or "includes" when used herein are to specify the presence of stated features or components, but do not preclude the addition of one or more other features or components.

In the drawings, the dimensions of elements may be exaggerated or downscaled for convenience of description. For example, since the size and thickness of each of components in the drawings are arbitrarily shown for convenience of description, the disclosure is not necessarily limited thereto.

In the following embodiments, the X-axis, the Y-axis and the Z-axis are not limited to three axes of the rectangular coordinate system and may be interpreted in a broader sense. For example, the X-axis, the Y-axis, and the Z-axis may be perpendicular to one another or may indicate different directions that are not perpendicular to one another.

When a certain embodiment can be implemented differently, a specific process order may be performed in a different manner from the described order. For example, two consecutively described processes may be performed substantially at the same time or performed in an order opposite to the described order.

The terms herein are used only to explain a specific embodiment and not intended to limit the disclosure. In this application, it will be understood that the term "includes" or "comprises", when used herein, specifies the presence of stated features, integers, steps, operations, elements, components, or a combination thereof, but does not preclude the presence or addition of one or more other features, integers, steps, operations, elements, components, or combinations thereof.

In the following embodiments, when a layer, a region, a component, and the like are referred to as being connected to each other, not only are the layer, the region, and the component directly connected to each other, but the layer, the region, and the component are indirectly connected to each other with another layer, region, and component arranged therebetween. For example, when a layer, a region, a component, and the like are referred to as being electrically connected to each other in the specification, not only are the layer, the region, and the component directly electrically connected to each other, but the layer, the region, and the component are indirectly electrically connected to each other with another layer, region, and component arranged therebetween.

Hereinafter, a power unit 10 according to an embodiment is described with reference to FIGS. 1 to 14.

FIG. 1 is a view showing a drone 1 as an example of a flight vehicle F including the power unit 10 according to an embodiment.

The power unit 10 may be used for the flight vehicle F having a hybrid electric propulsion system based on an internal combustion engine. For example, the drone 1 shown in FIG. 1 may be based on a hybrid electric propulsion system that includes an engine, a generator, and a battery. As shown in FIG. 1, the power unit 10 may be used in a form in which both the generator and the engine are connected to a propeller that is provided at a tail of the drone 1 and is used for cruise flight. However, the flight vehicle F including the power unit 10 is not limited to the drone 1 shown in FIG. 1. The power unit 10 may be utilized in other flight vehicles F using a hybrid electric propulsion system based on an internal combustion engine.

In the power unit 10, the entire output of one engine may be selectively used for driving either a power generator or a thrust generator. That is, the electric energy required to drive the flight vehicle F may be generated by using the entire output of the engine to drive the power generator, or the propulsion required to drive the flight vehicle F may be generated by using the entire output of the engine to drive the thrust generator.

Figure 2:
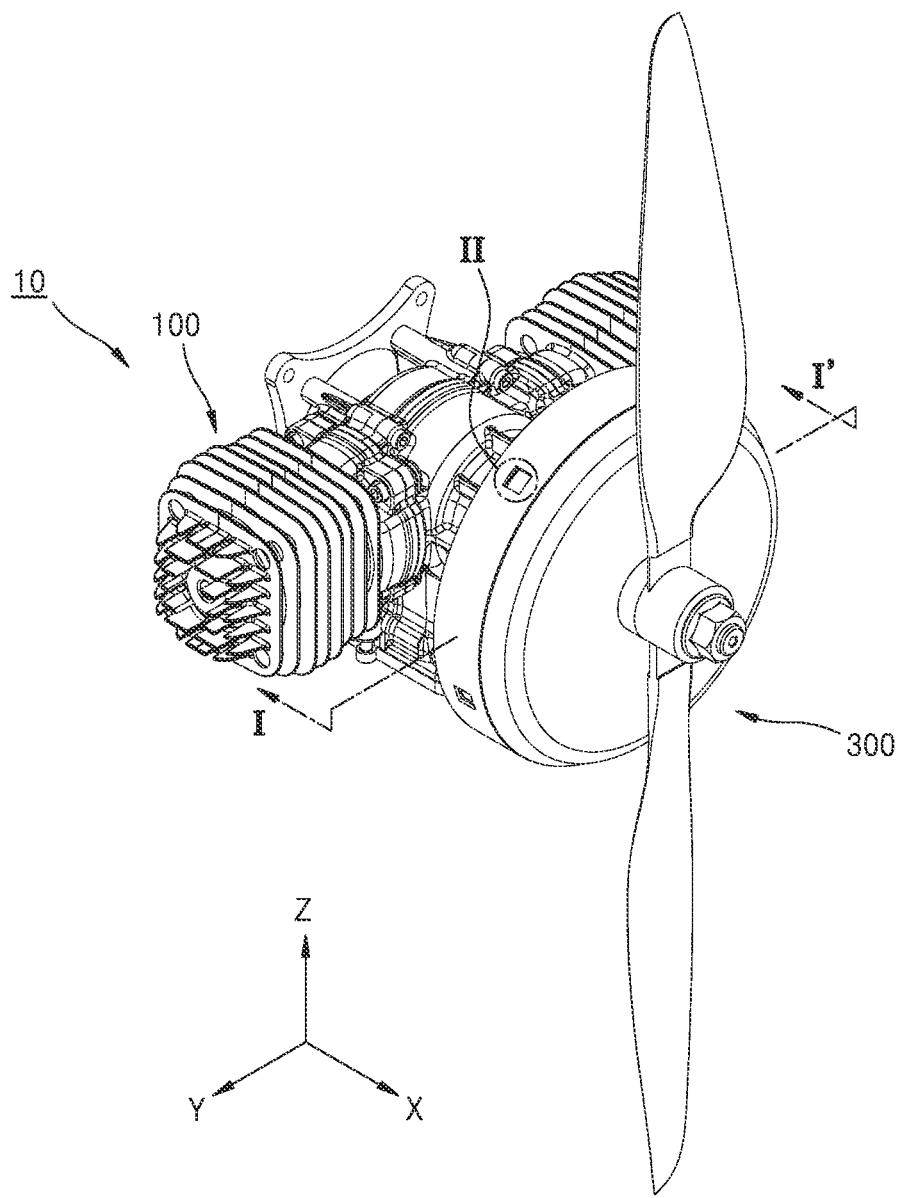
FIG. 2 is a perspective view showing the power unit according to an embodiment.
Figure 3:
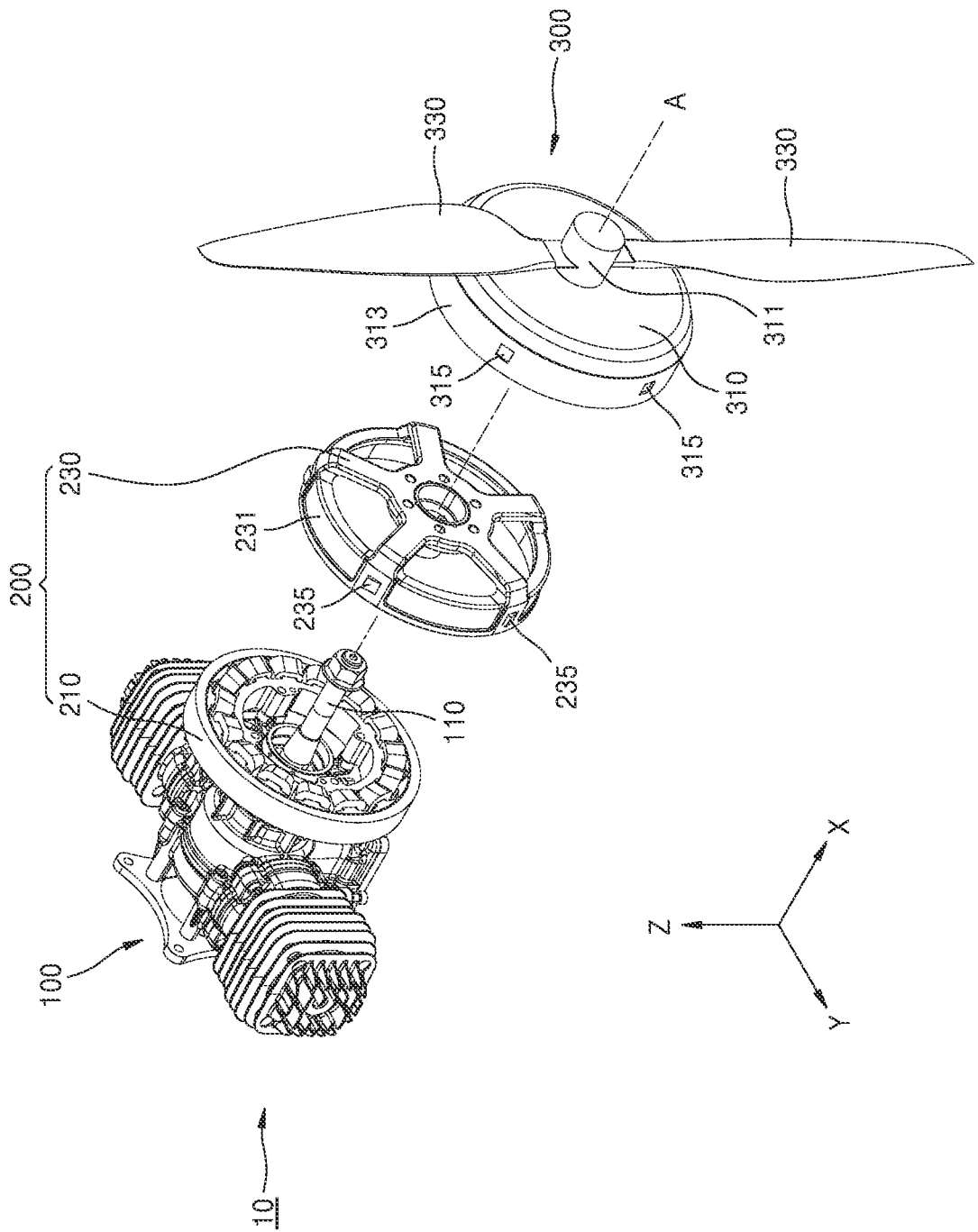
FIG. 3 is an exploded view of the power unit according to an embodiment.
Figure 4:
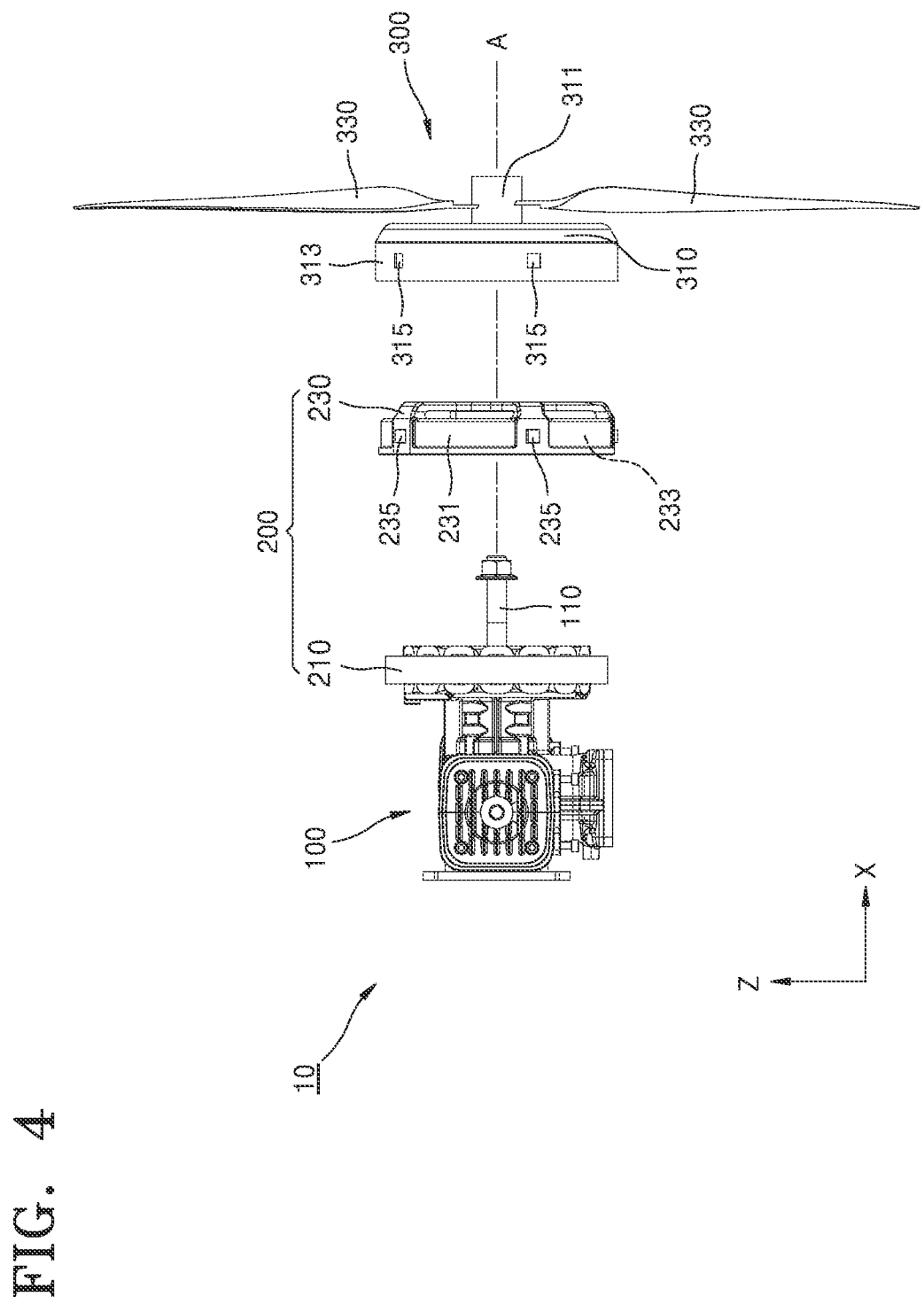
FIG. 4 is an exploded side view of the power unit according to an embodiment.

FIG. 2 is a perspective view showing the power unit 10 according to an embodiment. FIG. 3 is an exploded view of the power unit 10 according to an embodiment. FIG. 4 is an exploded side view of the power unit 10 according to an embodiment.

Referring to FIGS. 2 to 4, the power unit 10 may include an engine 100, a power generator 200, and a thrust generator 300.

The engine 100 may convert chemical energy into kinetic energy and output the same. In an embodiment, the engine 100 may include a reciprocating engine or a rotary engine. As shown in FIG. 2, the engine 100 may include a two-stroke piston engine, but the embodiment is not limited thereto.

Referring to FIGS. 3 and 4, the engine 100 may include a driving shaft 110. In an embodiment, the engine 100 may burn a fossil fuel to reciprocate a piston, and thus, chemical energy of the fossil fuel may be converted into rotational energy of the driving shaft 110 and output.

The driving shaft 110 may serve to transfer energy output from the engine 100 to another component and drive the component. The driving shaft 110 may rotate about a rotation axis A.

The power generator 200 may produce electric energy using a magnetic field and power. The power generator 200 may be provided on the driving shaft 110 and may supply the electric energy to the flight vehicle F. Referring to FIGS. 2 and 3, the power generator 200 may include a stator 210 and a rotor 230.

In the stator 210, an induced electromotive force is generated and electric energy may be produced. The stator 210 may be provided perpendicularly to the driving shaft 110, and a center thereof may be located on the rotation axis A of the driving shaft 110. The stator 210 may be fixed to a side surface of the engine 100 from which the driving shaft 110 protrudes. In the stator 210, as shown in FIG. 3, a plurality of iron cores may be arranged in a circumferential direction. A coil may be wound around each of the iron cores a plurality of times about a radial direction of the stator 210. As the rotor 230 described below includes a permanent magnet and rotates, an induced electromotive force is generated in the coil of the stator 210 to produce electric energy.

Figure 5:
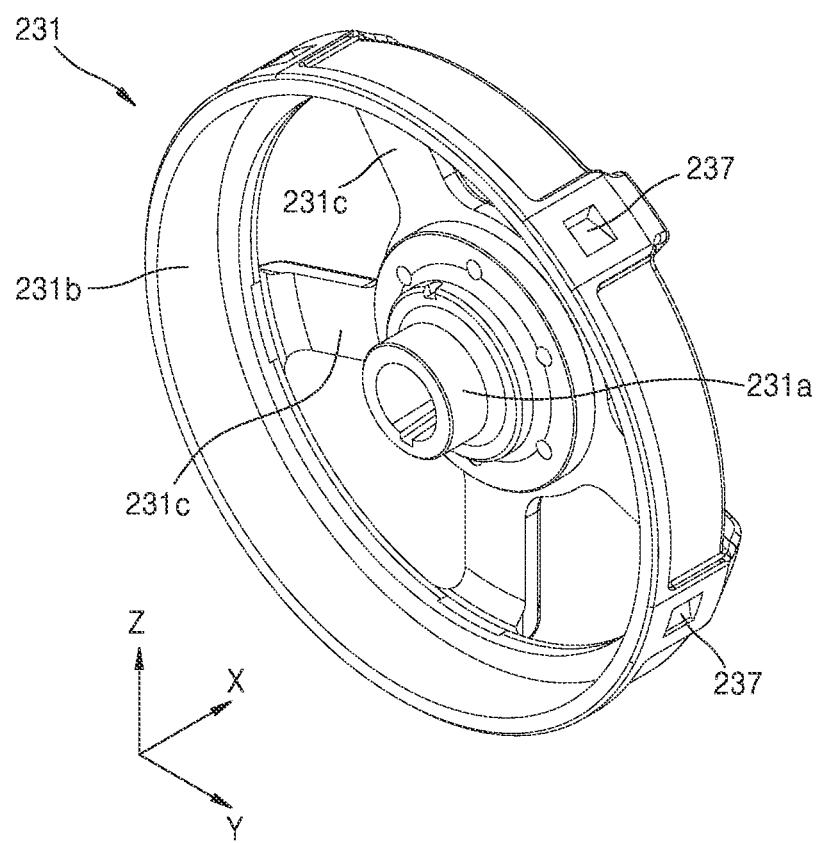
FIG. 5 is a perspective view showing a rotor body according to an embodiment.
Figure 6:
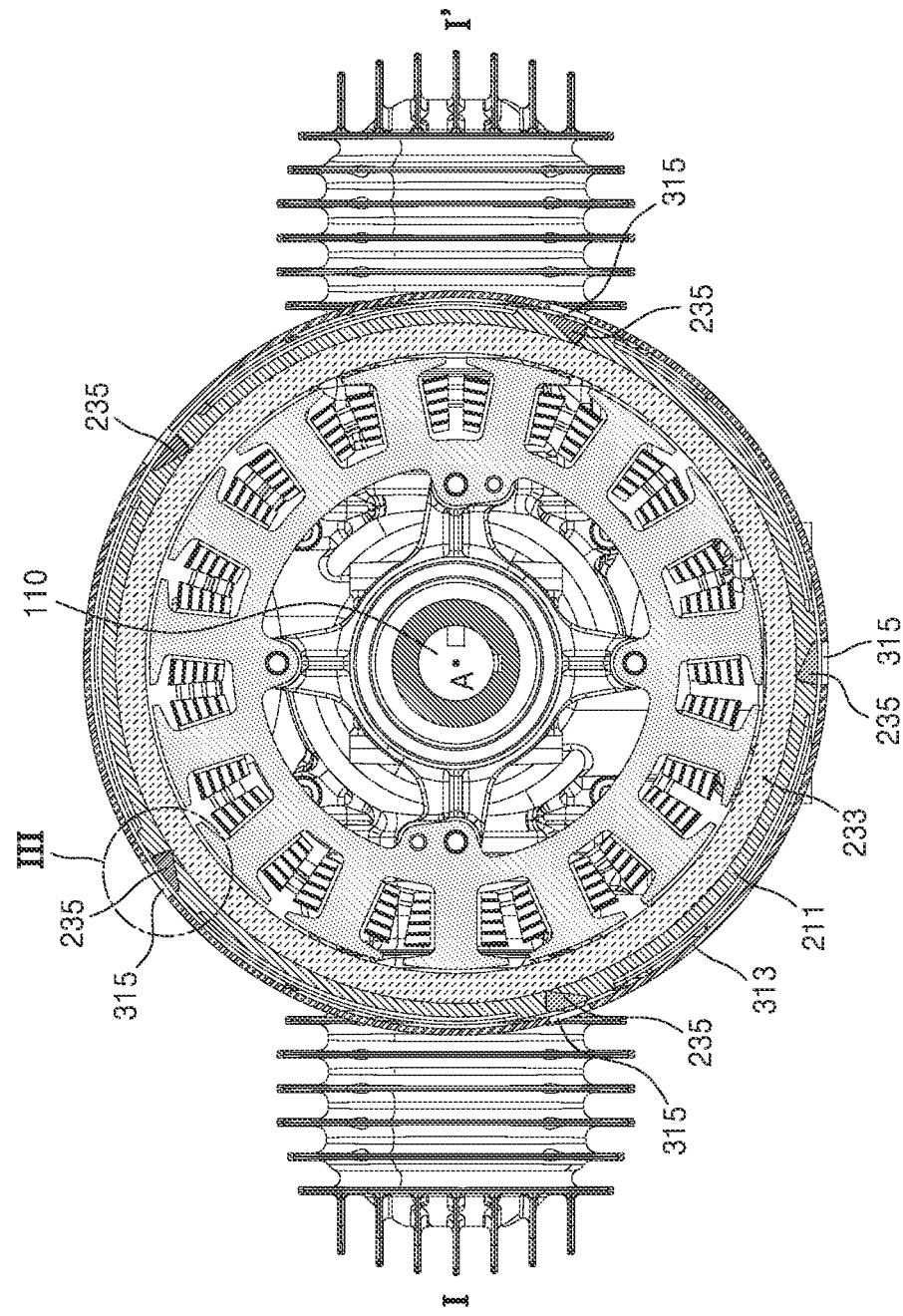
FIG. 6 is a cross-sectional view of the power unit taken along line I-I' of FIG. 2.

FIG. 5 is a perspective view showing a rotor body 231 according to an embodiment. FIG. 6 is a cross-sectional view of the power unit 10 taken along line I-I' of FIG. 2.

The rotor 230 may serve to change a magnetic field around the stator 210 to generate an induced electromotive force in the stator 210. Similar to the stator 210, the rotor 230 may be provided perpendicularly to the driving shaft 110, and the center thereof may be located on the rotation axis A of the driving shaft 110. A central portion of the rotor 230 may be fixed to the driving shaft 110. Therefore, the rotor 230 may rotate integrally with the driving shaft 110. In other words, the rotor 230 may rotate about the rotation axis A integrally with the driving shaft 110.

Referring to FIGS. 3 to 6, the rotor 230 may include the rotor body 231 and a permanent magnet 233.

The rotor body 231 may have a shape surrounding one side of the stator 210. Specifically, as shown in FIG. 5, the rotor body 231 may include a center portion 231a, an outer portion 231b, and a connection portion 231c.

The center portion 231a may be connected to the driving shaft 110 and fixed to the driving shaft 110. A method of fixing the center portion 231a to the driving shaft 110 is not particularly limited. In one embodiment, a key is formed on the driving shaft 110, and a groove corresponding to the key is formed in the center portion 231a of the rotor body 231. Accordingly, the driving shaft 110 including the key is fitted to the center portion 231a including the groove, and thus, the center portion 231a of the driving body 231 may be fixed to the driving shaft 110. Accordingly, the rotor body 231 may rotate integrally with the driving shaft 110.

The outer portion 231b of the rotor body 231 may have a circular ring shape centered on the rotation axis A. Specifically, the outer portion 231b may be positioned outside the stator 210 in a radial direction and have a shape surrounding the stator 210 in a circumferential direction. The 'outer circumferential surface of the rotor 230' described below has the same meaning as the 'outer surface of the outer portion 231b'.

The connection portion 231c of the rotor body 231 may connect the center portion 231a and the outer portion 231b to each other. The center portion 231a and the outer portion 231b may rotate integrally by the connection portion 231c. Referring to FIGS. 3 and 5, the connection portion 231c may be formed on the opposite side of the stator 210 from the engine 100 in the rotation axis A. That is, the outer portion 231b and the connection portion 231c may have a shape surrounding the stator 210 fixed to the engine 100. In FIGS. 3 to 5, a region, in which the connection portion 231c and the outer portion 231b are connected to each other, protrudes in a radial direction, but the shape of the rotor 230 is not limited thereto. In an embodiment, the region, in which the connection portion 231c and the outer portion 231b are connected to each other, may not protrude, and the outer circumferential surface of the outer portion 231b may have a circular cross-section.

Referring to FIG. 6, the permanent magnet 233 may be located between the driving shaft 110 and the outer portion 231b. Also, the permanent magnet 233 may be located outside the stator 210 in the radial direction. Specifically, the inner circumferential surface of the permanent magnet 233 may face the outer circumferential surface of the stator 210 at a certain interval (a gap). That is, the power generator 200 may be of an outer rotor-type. The permanent magnet 233 may be fixed to the rotor body 231. As the rotor 230 rotates integrally with the driving shaft 110, the permanent magnet 233 may rotate outside the stator 210 in the radial direction. Accordingly, the magnetic field inside the coil of the stator 210 is changed, and the induced electromotive force may be generated.

As the power generator 200 is of the outer rotor-type, the power generator 200 may be coupled to or decoupled from the thrust generator 300 which is provided outside the power generator 200 and described below in detail.

The material of the permanent magnet 233 is not particularly limited. In an embodiment, the material of the permanent magnet 233 may include a rare earth-based alloy having excellent magnetic properties. Specifically, the permanent magnet 233 may include a samarium cobalt (Sm—Co) alloy or a neodymium (Nd—Fe—B) alloy.

The thrust generator 300 may be provided on the outside of the power generator 200 and provide propulsion to the flight vehicle F. Referring to FIGS. 2 to 4, the thrust generator 300 may include a housing 310 and a rotary blade 330.

The housing 310 may have a shape surrounding one side of the rotor 230. Referring to FIG. 3, the housing 310 may have a cylindrical shape. Among the two sides of the housing 310 perpendicular to an X-axis, one side facing the engine 100 is open.

The center of a cylinder of the housing 310 may be located on the rotation axis A of the driving shaft 110. As described above, the center of the rotor 230 may be located on the rotation axis A of the driving shaft 110, and thus, the centers of all of the driving shaft 110, the rotor 230, and the housing 310 may be located on the rotation axis A. Accordingly, the housing 310 may be located coaxially with the rotor 230. When the housing 310 is coupled to the rotor 230, the driving shaft 110, the rotor 230, and the housing 310 may integrally rotate about the rotation axis A. The principle of coupling the housing 310 to the rotor 230 is described below.

The housing 310 may include a hub 311. The hub 311 may be formed at the center of the housing 310 in the direction of the rotation axis A. The rotary blade 330 described below may be connected to the hub 311.

A thrust bearing (not shown) may be provided between the end of the driving shaft 110 and the hub 311 and support the housing 310.

The housing 310 may include a housing sidewall 313. The housing sidewall 313 may have a circular ring shape centered on the rotation axis A. Specifically, the housing sidewall 313 may be located outside the rotor 230 in the radial direction and may have a shape surrounding the rotor 230, more preferably, the outer portion 231b in the circumferential direction. The 'inner circumferential surface of the housing 310' described below has the same meaning as the 'inner circumferential surface of the housing sidewall 313'.

In regions other than a hook 235 and a coupling groove 315 described below, the inner circumferential surface of the housing 310 and the outer circumferential surface of the rotor 230 may be in sliding contact with each other. In another embodiment, the inner circumferential surface of the housing 310 and the outer circumferential surface of the rotor 230 may maintain a constant gap.

The rotary blade 330 pushes a fluid backward while rotating, and thus, the rotary blades 330 may serve to generate propulsion for the flight vehicle F to fly. The rotary blade 330 may be provided in plurality. Two rotary blades 330 are shown in the drawings, but the embodiment is not particularly limited thereto. The rotary blades 330 may be provided at the hub 311. As shown in FIG. 4, the rotary blades 330 may be arranged perpendicularly to the rotation axis A and rotate about the rotation axis A.

In the power unit 10, when the temperature of the power generator 200 is greater than or equal to a first temperature, the power generator 200 and the thrust generator 300 are decoupled from each other. The power generator 200 may be driven by an output of the engine 100 to supply electric energy to the flight vehicle F.

In the power unit 10, when the temperature of the power generator 200 is less than the first temperature, the power generator 200 and the thrust generator 300 are coupled to each other. The thrust generator 300 may be driven by the output of the engine 100 to supply propulsion to the flight vehicle F.

Hereinafter, the principle, in which the power generator 200 and the thrust generator 300 are coupled to or decoupled from each other, is described.

Figure 7:
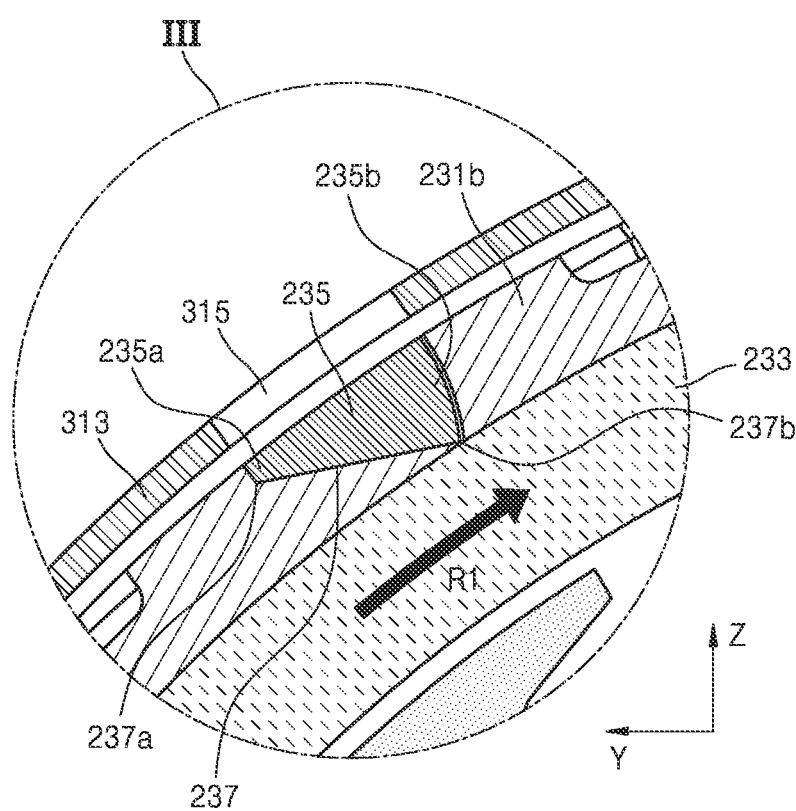
FIG. 7 is an enlarged view of a region III of FIG. 6 and shows a state in which a hook is inserted into an insertion groove.
Figure 8:
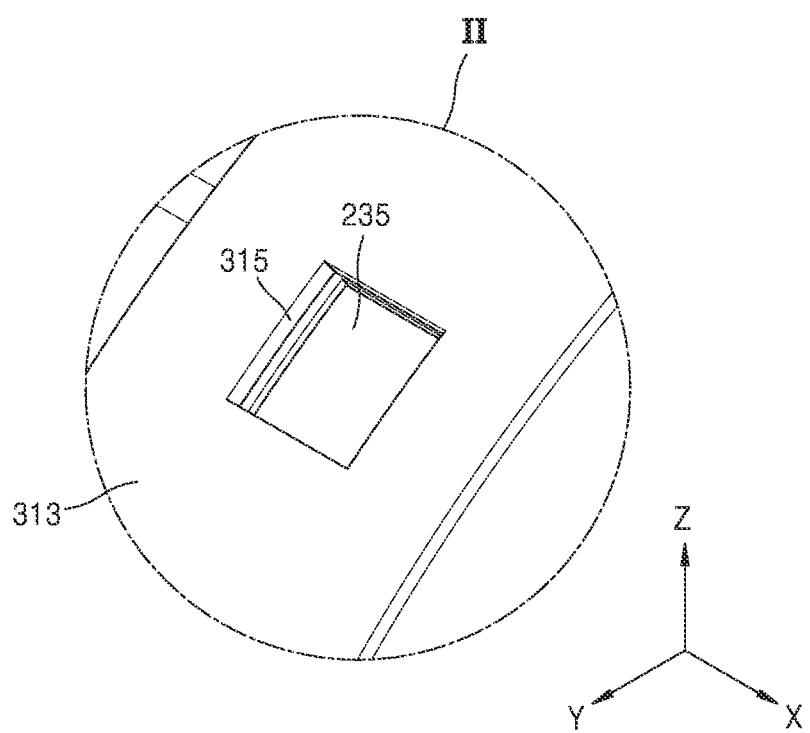
FIG. 8 is an enlarged view of a region II of FIG. 2 and shows a state in which a power generator and a thrust generator are decoupled from each other.
Figure 9:
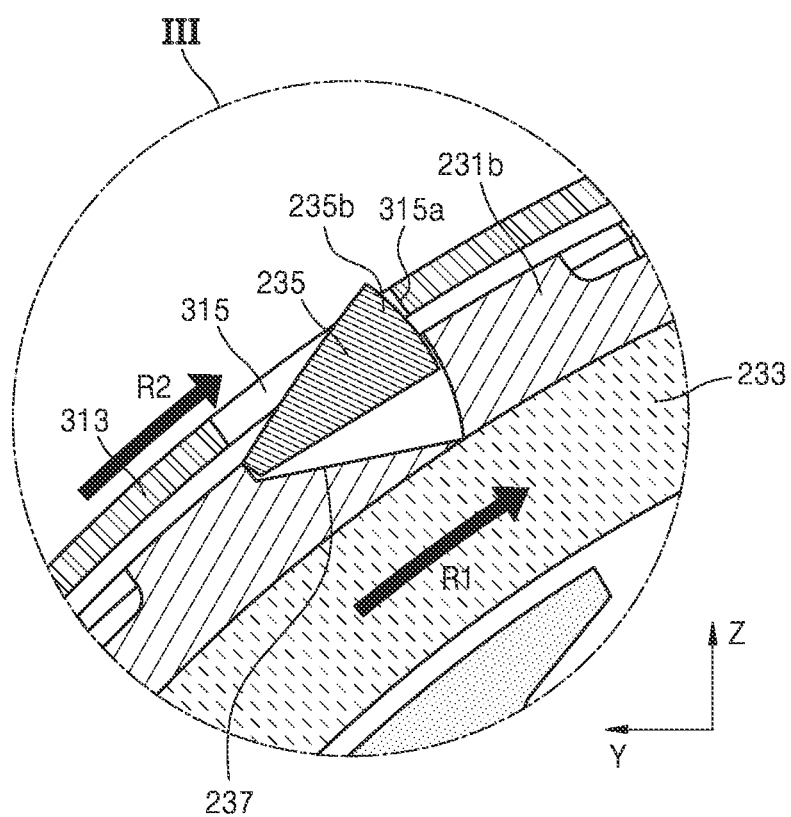
FIG. 9 is an enlarged view of the region III of FIG. 6 and shows a state in which the hook is coupled to a coupling groove.
Figure 10:
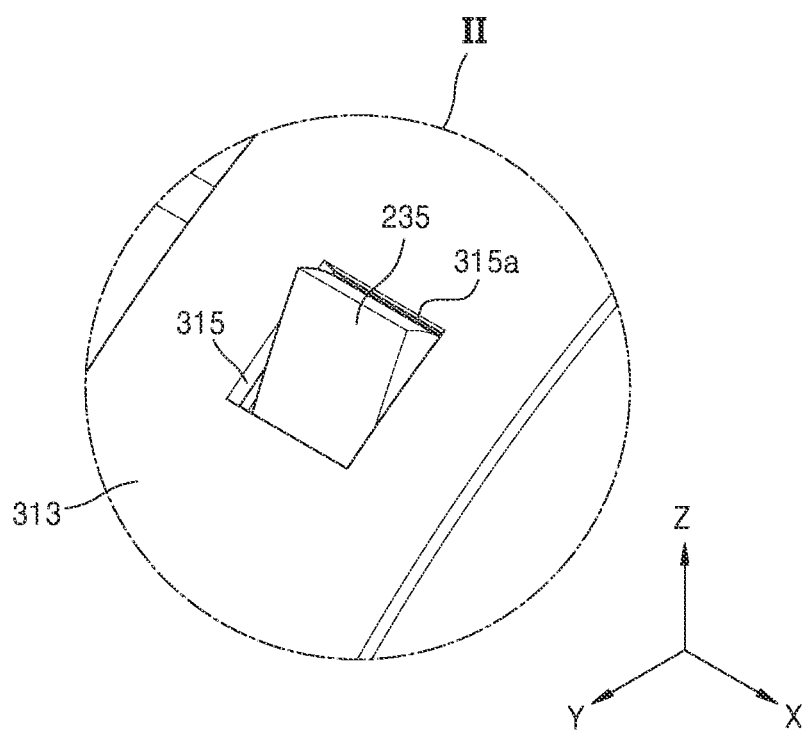
FIG. 10 is an enlarged view of the region II of FIG. 2 and shows a state in which the power generator and the thrust generator are coupled to each other.

FIG. 7 is an enlarged view of a region III of FIG. 6 and shows a state in which the hook 235 is inserted into an insertion groove 237. FIG. 8 is an enlarged view of a region II of FIG. 2 and shows a state in which the power generator 200 and the thrust generator 300 are decoupled from each other. FIG. 9 is an enlarged view of the region III of FIG. 6 and shows a state in which the hook 235 is coupled to the coupling groove 315. FIG. 10 is an enlarged view of the region II of FIG. 2 and shows a state in which the power generator 200 and the thrust generator 300 are coupled to each other.

The power generator 200 may further include at least one hook 235 and at least one insertion groove 237.

The hooks 235 enable the power generator 200 to be decoupled from or coupled to the thrust generator 300. The hooks 235 may be arranged on the rotor 230. Specifically, the hooks 235 may be arranged on the outer circumferential surface of the rotor 230 as shown in FIGS. 3 and 7.

The shape of the hook 235 is not particularly limited. In an embodiment, as shown in FIG. 7, the hook 235 may have a shape configured such that the width of the hook 235 on the cross-section increases from one end 235a of the hook 235 toward another end 235b.

At least one hook 235 may be arranged. Referring to FIG. 6, the plurality of hooks 235 may be arranged in the outer portion 231b of the rotor body 231 and spaced apart from each other in the circumferential direction.

Referring to FIGS. 5 to 7, insertion grooves 237 may be respectively formed at positions where the hooks 235 are arranged. Specifically, the insertion grooves 237 may be respectively formed in the rotor 230 at positions where the hooks 235 are arranged. More specifically, the insertion grooves 237 may be respectively formed in the outer circumferential surface of the rotor 230 at positions where the hooks 235 are arranged.

The insertion groove 237 may have a shape corresponding to the shape of the hook 235. In an embodiment, as shown in FIG. 7, the insertion groove 237 may have a shape configured such that the depth of the insertion groove 237 is increased from one side 237a of the insertion groove 237 corresponding to the one end 235a toward another side 237b of the insertion groove 237, so that the shape of the insertion groove 237 may correspond to that of the hook 235.

The insertion groove 237 has a shape corresponding to that of the hook 235 and is formed at the position where the hook 235 is provided, and thus, the hook 235 may be completely inserted into the insertion groove 237. When the hook 235 is completely inserted into the insertion groove 237 as shown in FIG. 7, there is no protruding region of the hook 235 outside the outer circumferential surface of the rotor 230.

At least one insertion groove 237 may be formed. Referring to FIG. 6, the plurality of insertion grooves 237 may be formed in the outer circumferential surface of the rotor 230 and spaced apart from each other in the circumferential direction.

Referring to FIG. 7, the one end 235a of the hook 235 may be connected to the one side 237a of the insertion groove 237. The connection method therebetween is not specifically limited. In an embodiment, the one end 235a of the hook 235 and the one side 237a of the insertion groove 237 may be connected to each other by a hinge. Accordingly, the hook 235 is not separated from the rotor 230, but may be inserted into the insertion groove 237 or protrude from the insertion groove 237 repeatedly.

The thrust generator 300 may further include at least one coupling groove 315.

The coupling grooves 315 may be formed in the thrust generator 300 and provided at positions corresponding to the hooks 235. Specifically, the coupling grooves 315 may be formed in the housing 310 and provided at the positions corresponding to the hooks 235. More specifically, referring to FIGS. 3, 4 and 7, the coupling grooves 315 may be formed in the inner circumferential surface of the housing 310 and provided at the positions corresponding to the hooks 235.

FIGS. 7 to 10 illustrate that the coupling groove 315 has a hole shape passing through the housing sidewall 313, but the shape of the coupling groove 315 is not limited thereto. In another embodiment, the coupling groove (not shown) may be formed in an engraved shape having a certain depth from the inner surface of the housing sidewall 313.

Referring to FIGS. 7 and 8, when the hook 235 is inserted into the insertion groove 237, there is no protruding portion out of the outer circumferential surface of the rotor 230, and thus, the entire outer circumferential surface of the rotor 230 and the entire inner circumferential surface of the housing 310, including regions in which the hooks 235 and the insertion grooves 237 face each other, may be in sliding contact with each other or maintain a certain gap therebetween. In this case, even if the rotor 230 rotates in a rotation direction R1, the housing 310 may not rotate because the rotational force of the rotor 230 is not transmitted to the housing 310. That is, in this case, the power generator 200 and the thrust generator 300 may be decoupled from each other.

Referring to FIGS. 9 and 10, the hook 235 protrudes out from the insertion groove 237, and thus, another end 235b of the hook 235 may be stuck on one surface 315a of the coupling groove 315. That is, the hook 235 may be coupled to the coupling groove 315. In this case, when the rotor 230 rotates in the rotation direction R1, the hook 235 may transmit the rotational force of the rotor 230 to the coupling groove 315. Accordingly, the housing 310 may rotate integrally with the rotor 230 in a rotation direction R2 which is the same as the direction in which the rotor 230 rotates. Therefore, in this case, the power generator 200 and the thrust generator 300 may be coupled to each other.

When the power generator 200 and the thrust generator 300 are decoupled from each other, only the rotor 230 may be rotated by rotation of the driving shaft 110, and the thrust generator 300 may not be rotated. Therefore, in this case, all of the output of the engine 100 is used only to drive the power generator 200, and thus, the power generator 200 may generate electric energy and supply the electric energy to the flight vehicle F.

When the power generator 200 and the thrust generator 300 are coupled to each other, the housing 310 may also be rotated together with the rotor 230 by the rotation of the driving shaft 110. Here, if the power generator 200 does not generate electric energy, in a state in which no load is applied to the power generator 200, and only the rotor 230 rotates, all of the output of the engine 100 is used only to drive the thrust generator 300, and thus, the thrust generator 300 may provide the propulsion to the flight vehicle F.

The power unit 10 has a structure in which the power generator 200 and the thrust generator 300 are decoupled from or coupled to each other, and thus, it is possible to selectively drive the power generator 200 or the thrust generator 300 with a single engine 100. Specifically, when the flight vehicle F to which the power unit 10 is installed performs vertical take-off and landing or hovering flight, the engine 100 may drive only the power generator 200 and supply the electric energy to a motor which rotates rotary blades 1a (see FIG. 1) used for the vertical take-off and landing or hovering flight. On the other hand, when the flight vehicle F switches to a long-distance cruise flight, the engine 100 may drive the thrust generator 300 instead of the power generator 200 to rotate the rotary blades 330, thereby providing the propulsion necessary for the cruise flight.

The power unit 10 may require only one engine 100 that drives the power generator 200 and the thrust generator 300, and thus, the volume and weight of the power unit 10 may be reduced. Accordingly, it is possible to secure a certain space in the flight vehicle F in which the power unit 10 is used, to improve the maneuverability and agility of the flight vehicle F, and to save energy used for the flight vehicle F.

Also, the power generator 200 and the thrust generator 300 may be decoupled from or coupled to each other according to the temperature of the power generator 200. Specifically, when the temperature of the power generator 200 is greater than or equal to a first temperature, the hook 235 may be inserted into the insertion groove 237, and thus, the power generator 200 and the thrust generator 300 may be separated from each other. In addition, when the temperature of the power generator 200 is less than the first temperature, the hook 235 may protrude out from the insertion groove 237 and be coupled to the coupling groove 315, and thus, the power generator 200 and the thrust generator 300 may be coupled to each other.

When the power generator 200 is driven to produce electric energy, heat may be generated in the coil of the stator 210 and the permanent magnet of the rotor 230, and the temperature of the power generator 200 may rise. That is, the temperature of the power generator 200 may be increased by driving the power generator 200. Accordingly, when the temperature of the power generator 200 is greater than or equal to the first temperature, the power generator 200 and the thrust generator 300 may be decoupled from each other, and thus, all of the output of the engine 100 may be used only to drive the power generator 200.

On the other hand, when the driving of the power generator 200 is stopped, the increased temperature of the power generator 200 may decrease. The stop of driving the power generator 200 refers to a state in which no load is applied to the power generator 200 and the power generator 200 no longer produces the electric energy. For reference, even when the engine 100 is driven, driving of the power generator 200 may be stopped, and in this case, only the rotor 230 rotates. That is, the temperature of the power generator 200 may be decreased by stopping the driving of the power generator 200. Accordingly, when the temperature of the power generator 200 is less than the first temperature, the power generator 200 and the thrust generator 300 may be coupled to each other, and thus, all of the output of the engine 100 may be used only to drive the thrust generator 300.

In other words, when the power generator 200 is driven, the output of the engine 100 may be used only to produce the electric energy. Also, when driving of the power generator 200 is stopped, the output of the engine 100 may be used only to produce the thrust. That is, whether the power generator 200 and the thrust generator 300 are decoupled from or coupled to each other may be determined by controlling whether the power generator 200 is driven or not.

The first temperature may refer to a certain temperature that the power generator 200 reaches when the power generator 200 is driven and the temperature thereof rises. Also, the first temperature may be determined by taking into consideration the types of coils or permanent magnets used in the power generator 200 and the levels of outputs of the engine 100.

Figure 11:
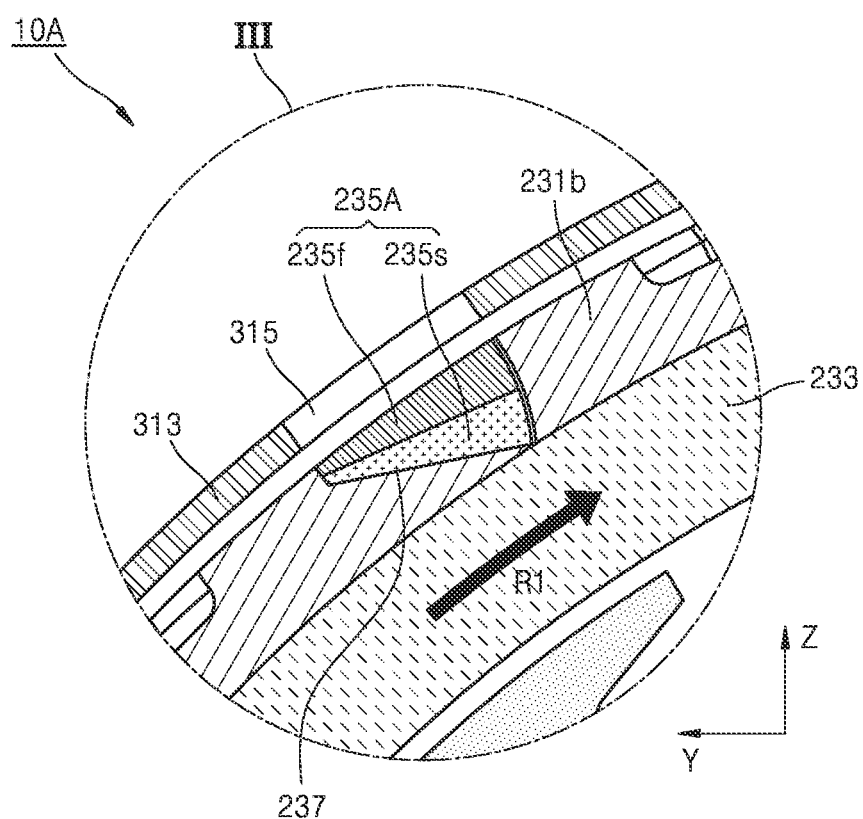
FIG. 11 is an enlarged view of the region III of FIG. 6 and shows a state in which a hook according to another embodiment is inserted into the insertion groove.
Figure 12:
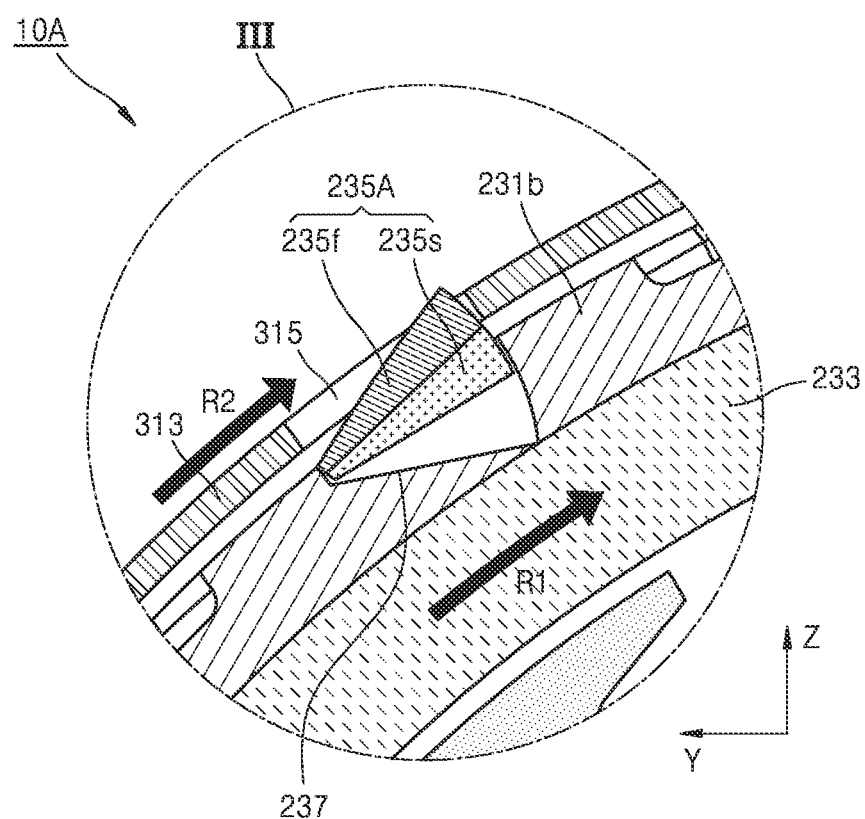
FIG. 12 is an enlarged view of the region III of FIG. 6 and shows a state in which the hook according to another embodiment is coupled to the coupling groove.

FIG. 11 is an enlarged view of the region III of FIG. 6 and shows a state in which a hook 235A according to another embodiment is inserted into the insertion groove 237. FIG. 12 is an enlarged view of the region III of FIG. 6 and shows a state in which the hook 235A according to another embodiment is coupled to the coupling groove 315.

Referring to FIG. 11, the hook 235A may include a first metal 235*f* and a second metal 235*s* having different thermal expansion coefficients. In other words, the hook 235A may include a bi-metal.

The bi-metal is obtained by attaching two metals having different thermal expansion coefficients. When heat is applied to the bi-metal, a metal having a higher thermal expansion coefficient expands more than a metal having a lower thermal expansion coefficient and may bend in a direction toward the metal having the lower thermal expansion coefficient.

In the case of the hook 235A, as shown in FIG. 11, the first metal 235*f* having a higher thermal expansion coefficient than the second metal 235*s* may be located on the outside the power generator 200. Accordingly, when the temperature of the power generator 200 rises, the hook 235A may bend in a direction toward the second metal 235*s*. On the other hand, when the temperature of the power generator 200 decreases, the hook 235A may be restored to an original shape thereof.

As shown in FIG. 12, the original shape of the hook 235A may have a shape coupled to the coupling groove 315.

Here, when the temperature of the power generator 200 is increased by driving the power generator 200 and exceeds the first temperature, the degree of expansion of the first metal 235*f* is greater than the degree of expansion of the second metal 235*s*. Accordingly, the hook 235A may bend in the direction toward the second metal 235*s*. The second metal 235*s* faces the inside of the insertion groove 237. Therefore, when the hook 235A bends in the direction toward the second metal 235*s*, the hook 235A may be inserted into the insertion groove 237. That is, when the power generator 200 is driven and the temperature of the power generator 200 becomes greater than or equal to the first temperature, the hook 235A may bend in the direction toward the second metal 235*s* and be inserted into the insertion groove 237 as shown in FIG. 11. Accordingly, the power generator 200 and the thrust generator 300 may be decoupled from each other. That is, even when the power generator 200 rotates in the rotation direction R1, the thrust generator 300 may not rotate.

On the other hand, when the driving of the power generator 200 is stopped and the temperature of the power generator 200 decreases to be less than the first temperature, the degree of contraction of the first metal 235*f* is greater than the degree of contraction of the second metal 235*s*. Accordingly, the hook 235A may return to the original shape thereof shown in FIG. 12. That is, when the power generator 200 stops driving and the temperature of the power generator 200 becomes less than the first temperature, the hook 235A may return to the original shape thereof and be coupled to the coupling groove 315. Accordingly, the power generator 200 and the thrust generator 300 may be coupled to each other. That is, when the power generator 200 rotates in the rotation direction R1, the thrust generator 300 may also rotate in a rotation direction R2 which is the same as the direction in which the power generator 200 rotates.

The materials of the first metal 235*f* and the second metal 235*s* are not particularly limited. The first metal 235*f* and the second metal 235*s* may be selected as metals that satisfy a difference in thermal expansion coefficients, which is calculated in consideration of designed values, such as the sizes of the hook 235A and the degrees of bending to be inserted into the insertion groove 237.

As the hook 235A includes a bi-metal, the decoupling or coupling between the power generator 200 and the thrust generator 300 may be performed only by a change in temperature of the power generator 200 without adding other components. Accordingly, it is possible to simplify the structure of a power unit 10A.

Figure 13:
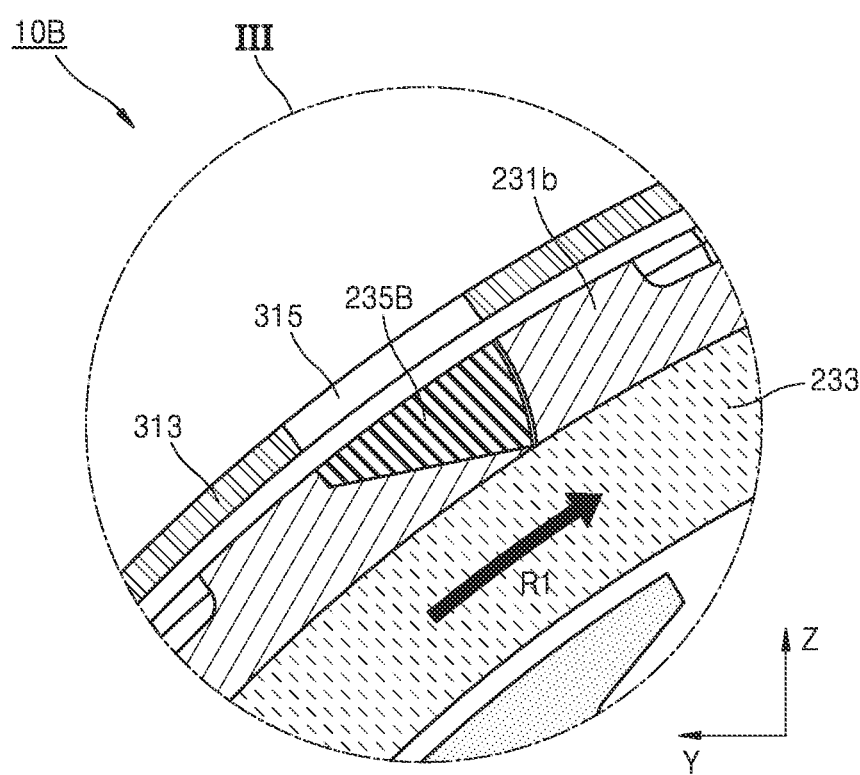
FIG. 13 is an enlarged view of the region III of FIG. 6 and shows a state in which a hook according to another embodiment is inserted into the insertion groove.
Figure 14:
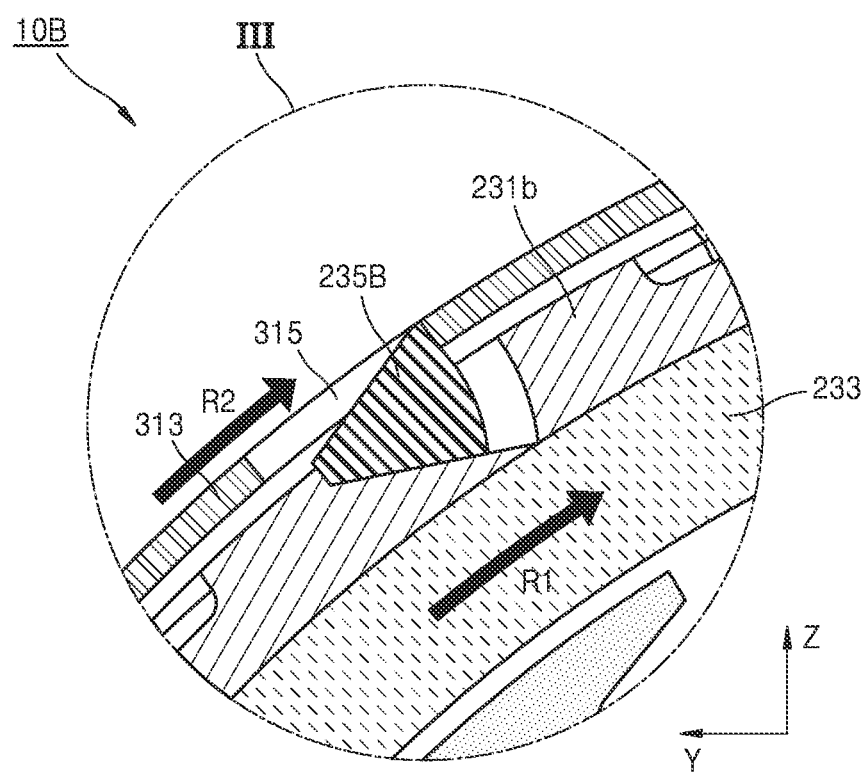
FIG. 14 is an enlarged view of the region III of FIG. 6 and shows a state in which the hook according to another embodiment is coupled to the coupling groove.

FIG. 13 is an enlarged view of the region III of FIG. 6 and shows a state in which a hook 235B according to another embodiment is inserted into the insertion groove 237. FIG. 14 is an enlarged view of the region III of FIG. 6 and shows a state in which the hook 235B according to another embodiment is coupled to the coupling groove 315. The hook 235B may include a shape memory alloy.

The shape memory alloy refers to an alloy having the shape restoration ability at a specific temperature. The shape memory alloy has a plurality of stable crystal structures that change with temperature, and may change from one crystal structure to another crystal structure according to a change in temperature. Therefore, even when the shape memory alloy has a shape at a low temperature, the shape memory alloy may be restored to the original shape thereof at a specific high temperature.

When the temperature of the hook 235B is greater than or equal to the first temperature, the hook 235B may have a shape inserted into the insertion groove 237 as shown in FIG. 13. That is, when the power generator 200 is driven and the temperature of the power generator 200 is greater than or equal to the first temperature, the hook 235B may generate a shape restoring force and be restored to the shape inserted into the insertion groove 237. Accordingly, the power generator 200 and the thrust generator 300 may be decoupled from each other. That is, even when the power generator 200 rotates in the rotation direction R1, the thrust generator 300 may not rotate.

When the temperature of the hook 235B is less than the first temperature, the hook 235B may have a shape inserted into the coupling groove 315 as shown in FIG. 14. That is, when the power generator 200 stops driving and the temperature of the power generator 200 becomes less than the first temperature, the hook 235B may be deformed into a shape that is stuck in the coupling groove 315. Accordingly, the power generator 200 and the thrust generator 300 may be coupled to each other. That is, when the power generator 200 rotates in the rotation direction R1, the thrust generator 300 may also rotate in the rotation direction R2 which is the same as the direction in which the power generator 200 rotates.

The material of the hook 235B is not particularly limited. In an embodiment, the hook 235B may include a nickel (Ni)-titanium (Ti)-based alloy, a nickel (Ni)-aluminum (Al)-based alloy, a nickel (Ni)-titanium (Ti)-copper (Cu)-based alloy, and a nickel (Ni)-aluminum (Al)-copper (Cu)-based alloy.

The shape of the hook 235B when the temperature thereof is greater than or equal to the first temperature is not particularly limited to the shape shown in FIG. 13, as long as the hook 235B is inserted into the insertion groove 237 and the hook 235B does not protrude out of the outer circumferential surface of the rotor 230. The shape of the hook 235B when the temperature thereof is lower than the first temperature is not particularly limited to the shape shown in FIG. 14, as long as the hook 235B is coupled to the coupling groove 315.

As the hook 235B includes a shape memory alloy, the decoupling or coupling between the power generator 200 and the thrust generator 300 may be performed only by a change in temperature of the power generator 200 without adding other components. Accordingly, it is possible to simplify the structure of a power unit 10B.

Figure 15:
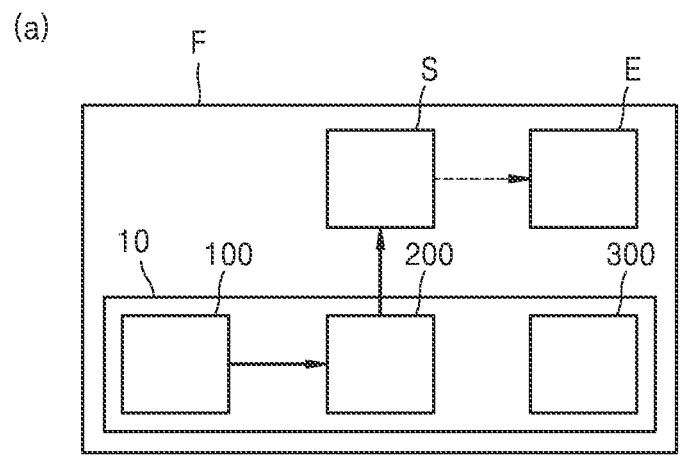
FIG. 15 is a diagram showing a flow direction of energy in a flight vehicle including a power unit.
Figure 15:
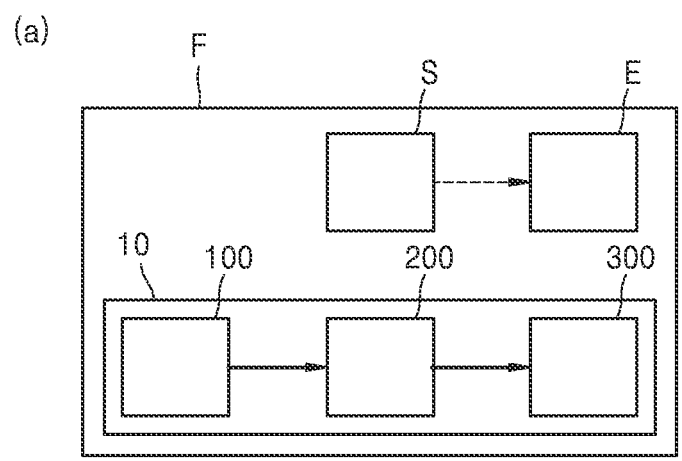
Figure 15:
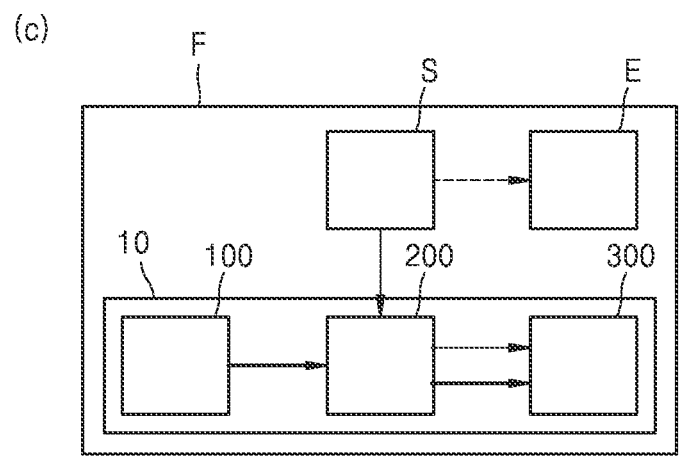

FIG. 15 is a diagram showing a flow direction of energy in a flight vehicle F in which a power unit 10 is used.

The flight vehicle F may include the power unit 10, an energy storage unit S for storing electric energy, and an electric driving unit E driven by the electric energy.

(a) of FIG. 15 shows a case in which a power generator 200 is decoupled from a thrust generator 300. Mechanical energy produced by the engine 100 may be converted into electric energy in the power generator 200 and stored in the energy storage unit S. The electric energy stored in the energy storage unit S may be supplied to the electric driving unit E.

(b) of FIG. 15 shows a case in which the power generator 200 is coupled to the thrust generator 300. The mechanical energy produced by the engine 100 may be transmitted to the thrust generator 300 via the power generator 200 when the temperature of the power generator 200 is less than a first temperature. The thrust generator 300 may produce the propulsion using the mechanical energy produced by the engine 100.

(c) of FIG. 15 shows another case in which the power generator 200 is coupled to the thrust generator 300. Similar to the case of (b) of FIG. 15, when the temperature of the power generator 200 is less than the first temperature, the thrust generator 300 may produce the propulsion from the mechanical energy produced by the engine 100. Furthermore, the power generator 200 may receive the electric energy from the flight vehicle F when the temperature of the power generator 200 is less than the first temperature and may provide additional power to the thrust generator 300.

The power generator 200 may include a stator 210 and a rotor 230 as described above. Accordingly, the power generator 200 may not only convert mechanical energy into electric energy, but also convert electric energy into mechanical energy. Specifically, when electric current flows through a coil of the stator 210, the rotor 230 may rotate. Since the rotor 230 and a housing 310 may be coupled to each other at a temperature below the first temperature, the mechanical energy may be transmitted to the thrust generator 300 by the rotation of the rotor 230.

However, a condition in which the power generator 200 may provide additional power to the thrust generator 300 is satisfied when the temperature of the power generator 200 is less than the first temperature. When the temperature of the power generator 200 is greater than or equal to the first temperature, the power generator 200 and the thrust generator 300 may be decoupled from each other, and thus, it is impossible to provide additional power. Also, when the power generator 200 converts electric energy into mechanical energy, heat may be generated. Accordingly, the temperature of the power generator 200 may increase. Therefore, in order for the power generator 200 to provide additional power to the thrust generator 300, the power generator 200 has to be operated only to the extent that the temperature of the power generator 200 is maintained below the first temperature.

There may be a case in which the flight vehicle F requires propulsion greater than the maximum propulsion that the engine 100 may provide to the flight vehicle F by driving the thrust generator 300. In this case, when the power generator 200 provides additional power to the thrust generator 300, the total magnitude of the propulsion that the thrust generator 300 provides to the flight vehicle F may be increased. Accordingly, performance of the flight vehicle F may be improved.

The power unit according to the embodiment has a structure in which the power generator and the thrust generator are decoupled from or coupled to each other, and thus, the power generator or the thrust generator may be selectively driven by the single engine.

The power unit according to the embodiment requires only one engine to drive the power generator and the thrust generator, and thus, the volume and weight of the power unit may be reduced. Accordingly, it is possible to secure a certain space in the flight vehicle in which the power unit is used, to improve the maneuverability and agility of the flight vehicle, and to save energy used for the flight vehicle.

In the power unit according to the embodiment, the power generator and the thrust generator are decoupled from or coupled to each other depending on the temperature of the power generator, and thus, whether the power generator and the thrust generator are decoupled from or coupled to each other may be controlled by whether or not the power generator is driven.

As the hook in the power unit according to the embodiment includes the bi-metal or the shape memory alloy, the decoupling or coupling between the power generator and the thrust generator may be performed only by the change in temperature of the power generator without adding other components. Accordingly, it is possible to simplify the structure of the power unit.

In the power unit according to the embodiment, the power generator provides the additional power to the thrust generator, and thus, the total magnitude of the propulsion that the thrust generator provides to the flight vehicle may be increased. Accordingly, the performance of the flight vehicle may be improved.

The effects of the disclosure are not limited to the aforementioned effects, but other effects not described herein will be clearly understood by those skilled in the art from the descriptions and the accompanying drawings.

The disclosure has been described with reference to the embodiments illustrated in the drawings, but the embodiments are merely illustrative. It will be understood by those skilled in the art that various modifications and other equivalent embodiments can be made from the embodiments. Hence, the real protective scope of the disclosure should be determined on the basis of the appended claims.

The specific technical features described in the embodiments are merely examples and are not intended to limit the technical scopes of the embodiments. In order to concisely and clearly describe the disclosure, descriptions of general techniques and configurations according to the related art may be omitted. Also, the connecting lines or connecting members between the components illustrated in the drawings refer to exemplary functional connections and/or physical or logical connections, and various alternative or additional functional connections, physical connections, or logical connections may be present in a practical device. Also, unless a specific term such as "essential" or "important" is mentioned for a component, the component may not be a necessary component for the application of the disclosure.

The term "the" or similar references used in the detailed description and claims may cover both the singular and the plural unless specifically limited. Also, if a range is used in an embodiment, the embodiment may be regarded as including an embodiment in which an individual value belonging to the range is applied (unless otherwise stated), and the individual values constituting the range are written in the detailed description. Unless the order of operations organizing a method according to an embodiment is explicitly mentioned or described otherwise, the operations may be performed in any suitable order. The embodiments are not necessarily limited to the mentioned order of the operations. The use of all examples or exemplary terms (e.g., "etc.," "and (or) the like," and "and so forth") in an embodiment is merely intended to describe the embodiment in detail, and the scope of the embodiment is not limited by the examples or exemplary terms unless defined by the claims. Also, it will be understood by those of ordinary skill in the art that the disclosure can be made according to design conditions and factors within the range of the claims, in which various changes, combinations, and modifications are added, or an equivalent thereof.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A power unit comprising:
an engine comprising a driving shaft;
a power generator provided on the driving shaft and configured to supply electric energy to a flight vehicle; and
a thrust generator provided on an outer side of the power generator and configured to provide a propulsion force to the flight vehicle,
wherein when a temperature of the power generator is greater than or equal to a first temperature, the power generator and the thrust generator are decoupled from each other, and the power generator is driven by an output of the engine and supplies the electric energy to the flight vehicle, and when the temperature of the power generator is less than the first temperature, the power generator and the thrust generator are coupled to each other, and the thrust generator is driven by the output of the engine and provides the propulsion force to the flight vehicle.

2. The power unit of claim 1, wherein the power generator comprises:
at least one hook enabling decoupling and coupling between the thrust generator and the power generator; and
at least one insertion groove formed at a position at which the hook is located, and having a shape corresponding to a shape of the hook,
wherein the thrust generator comprises at least one coupling groove formed at the position corresponding to the hook.

3. The power unit of claim 2, wherein the power generator comprises a rotor that rotates integrally with the driving shaft,
the thrust generator comprises a housing that is located coaxially with the rotor,
the hook is located on the rotor,
the insertion groove is formed in the rotor at a position at which the hook is located, and
the coupling groove is formed in the housing at a position corresponding to the hook.

4. The power unit of claim 3, wherein when the temperature of the power generator is greater than or equal to the first temperature, the hook is inserted into the insertion groove, and the power generator and the thrust generator are decoupled from each other.

5. The power unit of claim 3, wherein when the temperature of the power generator is less than the first temperature, the hook protrudes out from the insertion groove and is coupled to the coupling groove, and the power generator and the thrust generator are coupled to each other.

6. The power unit of claim 2, wherein the hook comprises a first metal and a second metal that have thermal expansion coefficients different from each other.

7. The power unit of claim 6, wherein the first metal having a greater thermal expansion coefficient than the second metal is located on the outer side of the power generator.

8. The power unit of claim 7, wherein when the temperature of the power generator is greater than or equal to the first temperature, the hook is bent in a direction toward the second metal and is inserted into the insertion groove, and
when the temperature of the power generator is less than the first temperature, the hook is restored to an original shape thereof and coupled to the coupling groove.

9. The power unit of claim 2, wherein the hook comprises a shape memory alloy.

10. The power unit of claim 9, wherein the hook has a shape so that the hook is
inserted into the insertion groove at a temperature greater than or equal to the first temperature and
coupled to the coupling groove at a temperature less than the first temperature.

11. The power unit of claim 1, wherein when the temperature of the power generator is less than the first temperature, the power generator receives the electric energy from the flight vehicle and provides additional power to the thrust generator.

* * * * *